United States Patent
Schrader

(10) Patent No.: US 11,672,197 B2
(45) Date of Patent: Jun. 13, 2023

(54) SYSTEMS AND METHODS FOR SUPPRESSING VAPORIZATION OF VOLATILE FLUIDS IN AGRICULTURAL FLUID APPLICATION SYSTEMS

(71) Applicant: Capstan Ag Systems, Inc., Topeka, KS (US)

(72) Inventor: Kale Schrader, Hiawatha, KS (US)

(73) Assignee: Capstan Ag Systems, Inc., Topeka, KS (US)

( * ) Notice: Subject to any disclaimer, the term of this patent is extended or adjusted under 35 U.S.C. 154(b) by 174 days.

(21) Appl. No.: 17/247,305

(22) Filed: Dec. 7, 2020

(65) Prior Publication Data

US 2021/0100159 A1     Apr. 8, 2021

Related U.S. Application Data

(63) Continuation of application No. 16/050,942, filed on Jul. 31, 2018, now Pat. No. 10,856,464.

(60) Provisional application No. 62/539,702, filed on Aug. 1, 2017.

(51) Int. Cl.
| | |
|---|---|
| *A01C 23/02* | (2006.01) |
| *A01C 23/00* | (2006.01) |
| *B05B 9/08* | (2006.01) |
| *B05B 12/02* | (2006.01) |
| *B05B 15/40* | (2018.01) |
| *B05B 12/08* | (2006.01) |

(Continued)

(52) U.S. Cl.
CPC .......... *A01C 23/024* (2013.01); *A01C 23/007* (2013.01); *B05B 9/0822* (2013.01); *B05B 12/02* (2013.01); *B05B 12/087* (2013.01); *B05B 15/40* (2018.02); *F17C 7/04* (2013.01); *F17C 13/02* (2013.01); *F17C 2227/0157* (2013.01)

(58) Field of Classification Search
CPC .... F17C 13/02; F17C 2227/0157; F17C 7/04; B05B 12/02; B05B 12/087; B05B 15/40; B05B 9/0822; A01C 23/007; A01C 23/024

See application file for complete search history.

(56) References Cited

U.S. PATENT DOCUMENTS

| | | |
|---|---|---|
| 2,938,360 A | 5/1960 | Christensen |
| 2,973,728 A | 3/1961 | Garretson |
| 3,556,027 A | 1/1971 | Ammann |

(Continued)

*Primary Examiner* — Henry T Crenshaw
(74) *Attorney, Agent, or Firm* — Armstrong Teasdale LLP

(57) ABSTRACT

Systems and methods for suppressing vaporization of a volatile fluid dispensed from a pressure vessel are provided. The system includes an evaporator coupled in thermal communication with a first flow of volatile fluid from the vessel and in fluid communication with a second flow of volatile fluid from the vessel. The evaporator includes at least one channel for channeling the second flow of volatile fluid therethrough. A metering valve is coupled in fluid communication with the channel and between the evaporator and the vessel. In addition, the system includes a compressor coupled in fluid communication with and downstream from the at least one channel. Moreover, the system includes a return line coupled in fluid communication with an outlet of the compressor. The compressor is configured to compress the second flow of volatile fluid and channel the compressed second flow of volatile fluid to the pressure vessel via the return line.

30 Claims, 6 Drawing Sheets

(51) Int. Cl.
*F17C 7/04* (2006.01)
*F17C 13/02* (2006.01)

(56) References Cited

U.S. PATENT DOCUMENTS

| | | | |
|---|---|---|---|
| 3,885,402 A * | 5/1975 | Moody, Jr. | F25B 1/047 |
| | | | 62/505 |
| 4,341,168 A | 7/1982 | Siebert | |
| 4,364,409 A | 12/1982 | Jones | |
| 4,385,500 A * | 5/1983 | Kjelgaard | F17C 7/02 |
| | | | 111/119 |
| 4,458,609 A * | 7/1984 | Tofte | F28D 7/103 |
| | | | 62/48.1 |
| 4,657,568 A | 4/1987 | Jones | |
| 4,807,663 A | 2/1989 | Jones | |
| 5,098,680 A | 3/1992 | Fellows et al. | |
| 5,134,961 A | 8/1992 | Giles et al. | |
| 5,170,820 A | 12/1992 | Jones | |
| 5,334,987 A | 8/1994 | Teach | |
| 5,435,145 A * | 7/1995 | Jaster | F25B 41/347 |
| | | | 251/129.05 |
| 5,574,657 A | 11/1996 | Tofte et al. | |
| 5,653,389 A | 8/1997 | Henderson et al. | |
| 5,845,592 A | 12/1998 | Ridgley | |
| 5,890,445 A * | 4/1999 | Ridgley | A01C 23/024 |
| | | | 239/149 |
| 5,967,066 A * | 10/1999 | Giles | A01C 23/024 |
| | | | 111/119 |
| 6,269,757 B1 * | 8/2001 | Kiest | A01C 23/024 |
| | | | 111/119 |
| 7,096,802 B1 | 8/2006 | Kiest | |
| 9,901,027 B1 * | 2/2018 | Ward | F22B 1/284 |
| 2001/0015161 A1 * | 8/2001 | Swanson | A01C 23/024 |
| | | | 111/119 |
| 2003/0205213 A1 * | 11/2003 | Aquino | F04D 29/023 |
| | | | 123/241 |
| 2010/0126186 A1 * | 5/2010 | Marriott | F25J 1/0025 |
| | | | 62/50.3 |
| 2010/0162739 A1 * | 7/2010 | Kopko | F24F 1/50 |
| | | | 62/115 |
| 2011/0048043 A1 * | 3/2011 | Takahashi | F01K 3/006 |
| | | | 62/115 |

* cited by examiner

SYSTEMS AND METHODS FOR SUPPRESSING VAPORIZATION OF VOLATILE FLUIDS IN AGRICULTURAL FLUID APPLICATION SYSTEMS

CROSS-REFERENCE TO RELATED APPLICATIONS

This application is a continuation of U.S. patent application Ser. No. 16/050,942, filed on Jul. 31, 2018, which claims priority to U.S. Provisional Patent Application Ser. No. 62/539,702, filed on Aug. 1, 2017, the disclosure of which is hereby incorporated by reference in its entirety.

BACKGROUND

The present disclosure relates generally to fluid application systems, and particularly, to vapor compression systems for use with fluid application systems for dispensing a volatile fluid for application to agricultural fields.

The agricultural industry commonly applies fluids, such as fertilizer, to fields during the cultivation of crops. Nitrogen rich chemicals are typically used as fertilizer, which is applied to soil to provide nutrients for plants. Anhydrous ammonia, for example, is a relatively dense nitrogen source commonly used as a fertilizer. However, anhydrous ammonia must be maintained within a pressure range to remain in liquid form.

In some known fluid dispersal systems, anhydrous ammonia is stored in a tank pulled, for example, by a tractor. Agricultural application of anhydrous ammonia includes cutting the soil and injecting the anhydrous ammonia into the cuts, below the soil surface. The anhydrous ammonia is injected in a liquid or gaseous form. As the anhydrous ammonia is dispensed from the tank, vapor pressure within the tank may gradually decrease. As the vapor pressure decreases, portions of the remaining anhydrous ammonia may begin to boil, or change to a vapor. Vaporization of the anhydrous ammonia may also occur within the fluid dispersal system as a result of pressure drops as the anhydrous ammonia travels through the fluid dispersal system.

In some fluid dispersal systems, metering and control of anhydrous ammonia application is volumetrically based—i.e., based on a measured volumetric flow of anhydrous ammonia. Vaporization of anhydrous ammonia may result in inaccurate measurements and/or application because of the volumetric difference between liquid and vapor anhydrous ammonia. Accordingly, it is desirable to maintain and dispense anhydrous ammonia in liquid form to facilitate accurate measurement and application.

At least some known fluid dispersal systems use heat exchanger systems to cool the anhydrous ammonia to facilitate maintaining a liquid form of the anhydrous ammonia. However, known heat exchanger systems provide less than optimal vapor suppression of anhydrous ammonia for certain applications.

BRIEF DESCRIPTION

In one embodiment, a system for suppressing vaporization of a volatile fluid dispensed from a pressure vessel is provided. The system includes an evaporator coupled in thermal communication with a first flow of volatile fluid from the pressure vessel and in fluid communication with a second flow of volatile fluid from the pressure vessel. The evaporator includes at least one channel therein for channeling the second flow of volatile fluid therethrough. The system also includes a metering valve coupled in fluid communication with the at least one channel and fluidly connected between the evaporator and the pressure vessel. The metering valve is configured to regulate a flow rate of volatile fluid channeled to said evaporator. In addition, the system includes a compressor coupled in fluid communication with and downstream from the at least one channel. Moreover, the system includes a return line coupled in fluid communication with an outlet of the compressor. The compressor is configured to compress the second flow of volatile fluid and channel the compressed second flow of volatile fluid to the pressure vessel via the return line.

In another embodiment, a method for suppressing vaporization of a volatile fluid dispensed from a pressure vessel is provided. The method includes channeling a first flow of volatile fluid from the pressure vessel to a distribution manifold, and channeling a second flow of volatile fluid from the pressure vessel to an evaporator in thermal communication with the first flow of volatile fluid. The method also includes expanding the second flow of volatile fluid using a metering valve to produce an expanded second flow of volatile fluid having a reduced pressure and temperature. The metering valve is coupled in fluid communication with the evaporator and fluidly connected between the evaporator and the pressure vessel. Furthermore, the method includes compressing the expanded second flow of volatile fluid using a compressor coupled to the evaporator to produce a compressed second flow of volatile fluid having an increased pressure and temperature. Moreover, the method includes channeling the compressed second flow of volatile fluid to the pressure vessel via a return line. The temperature of the compressed second flow of volatile fluid is greater than a tank temperature of volatile fluid contained in the pressure vessel.

In yet another embodiment, a fluid application system is provided. The fluid application system includes a fluid line configured to channel a flow of volatile fluid from a pressure vessel. The fluid application system also includes a distribution manifold coupled in fluid communication to the fluid line. The distribution manifold includes a plurality of fluid dispensing lines. In addition, the distribution manifold is configured to receive a first flow of volatile fluid from the fluid line and channel the first flow of volatile fluid to the plurality of fluid dispensing lines. The fluid application system further includes a vapor compression system coupled in fluid communication to the fluid line. The vapor compression system includes an evaporator having at least one channel therein for receiving a second flow of volatile fluid from the fluid line and channeling the second flow of volatile fluid therethrough. The vapor compression system also includes a metering valve coupled in fluid communication with the at least one channel and fluidly connected between the evaporator and the pressure vessel. The metering valve is configured to regulate a flow rate of volatile fluid channeled to the evaporator. The vapor compression system also includes a compressor coupled in fluid communication with and downstream from the at least one channel. The vapor compression system also includes a return line coupled in fluid communication with an outlet of the compressor. The evaporator is coupled in thermal communication with the first flow of volatile fluid for cooling the first flow of volatile fluid. In addition, the compressor is configured to compress the second flow of volatile fluid and channel the compressed second flow of volatile fluid to the pressure vessel via the return line.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Figure 1:
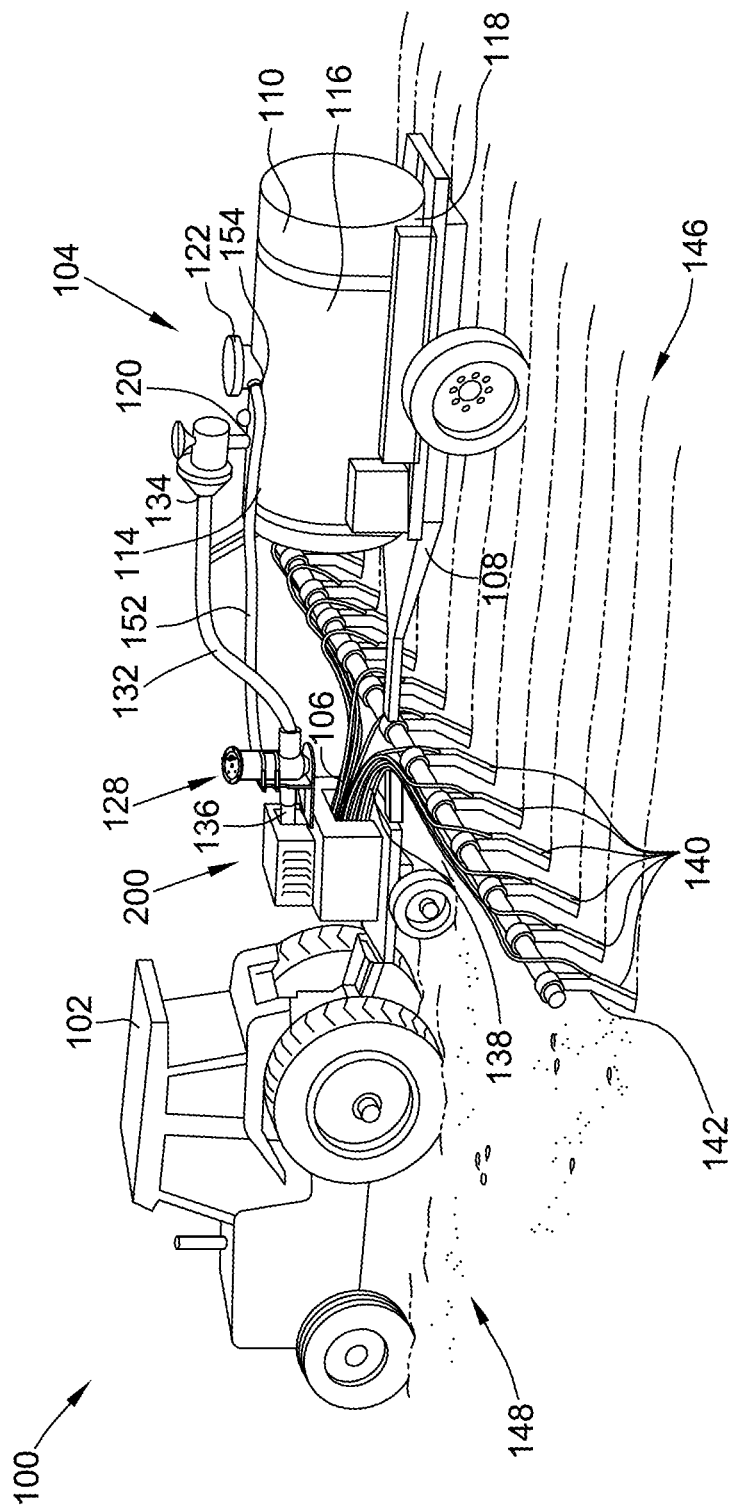
FIG. 1 is a perspective view of an embodiment of a fluid application system.
Figure 2:
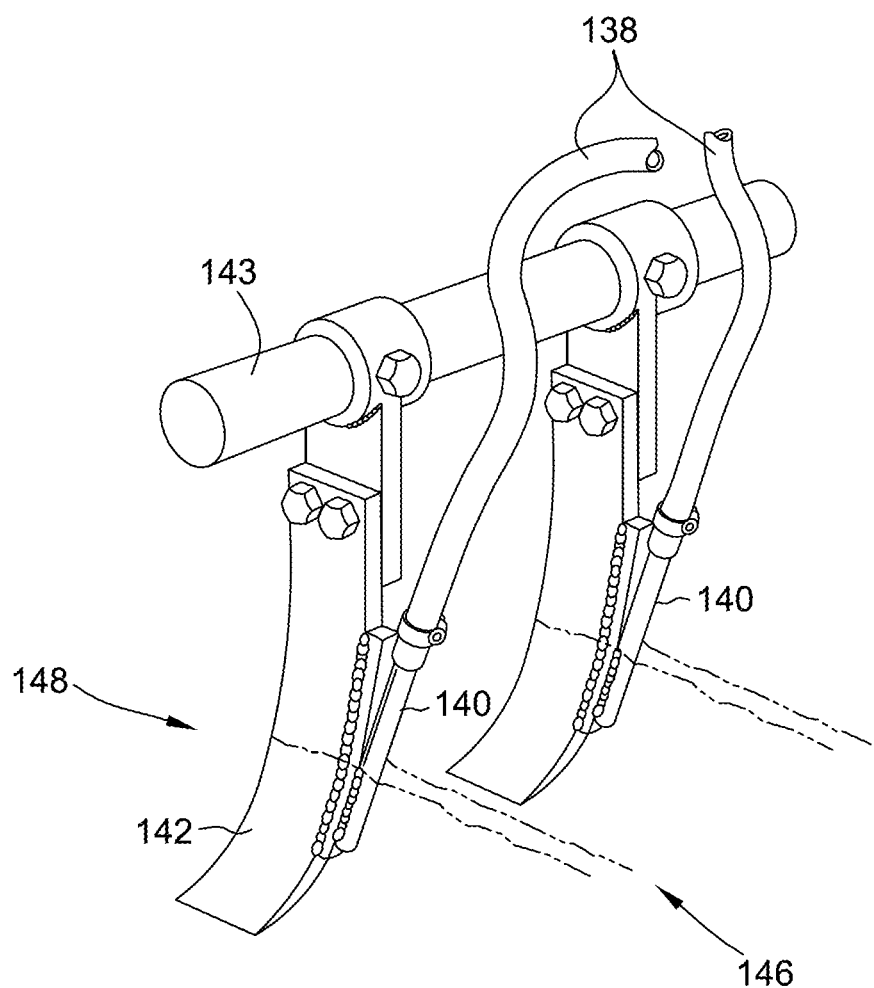
FIG. 2 is a perspective view of a portion of the fluid application system shown in FIG. 1.
Figure 3:
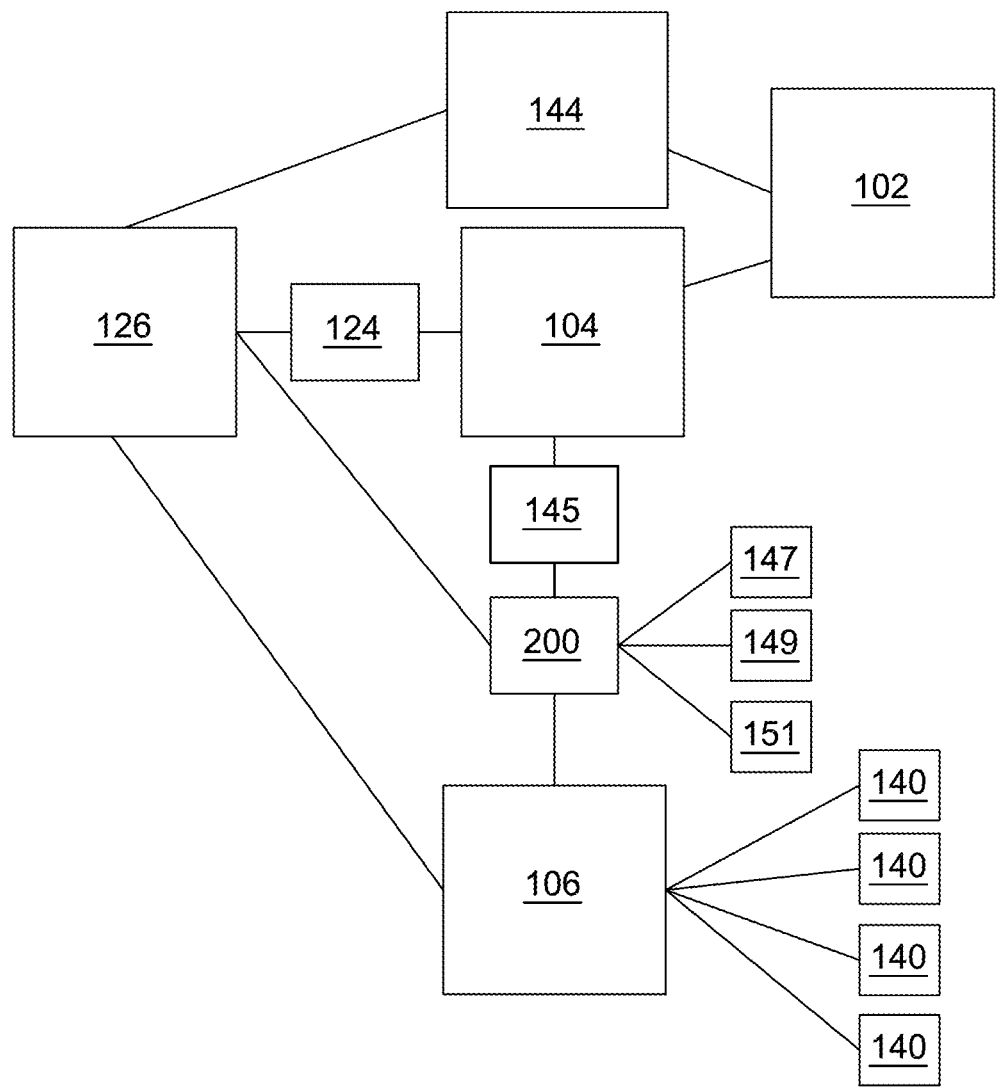
FIG. 3 is a block diagram of the fluid application system shown in FIG. 1.

Referring now to the drawings and in particular to FIGS. 1-3, in the exemplary embodiment, a volatile liquid application system (generally, a fluid application system), generally indicated at 100, includes a vehicle 102, a fluid storage tank 104 (generally, a pressure vessel), and a distribution manifold 106. In the exemplary embodiment, the vehicle 102 is a tractor. Alternatively, the vehicle 102 may be any machine that enables the fluid application system 100 to function as described herein. In suitable embodiments, one or more components of the fluid application system 100 may be incorporated into the vehicle 102 without departing from some aspects of this disclosure. In the exemplary embodiment, the fluid storage tank 104 and the distribution manifold 106 are disposed on a wheeled chassis 108 that is towed behind the vehicle 102.

In the exemplary embodiment, the fluid storage tank 104 includes a sidewall 110 defining an interior space. In suitable embodiments, the fluid storage tank 104 may have any shape that enables the fluid application system 100 to function as described herein. In the illustrated embodiment, the sidewall 110 forms a cylinder having closed ends. With reference to the orientation shown in FIG. 1, the fluid storage tank 104 has an upper portion 114, a lower portion 118, and a middle portion 116 disposed between the upper portion 114 and the lower portion 118. An outlet 120 and an inlet 122 are disposed in the upper portion 114. In suitable embodiments, the fluid storage tank 104 may include any number of outlets and inlets in any portions of the fluid storage tank 104 without departing from some aspects of this disclosure. In some embodiments, for example, the storage tank 104 may include at least two inlets, such as a liquid fill valve and a fluid return line.

Figure 4:
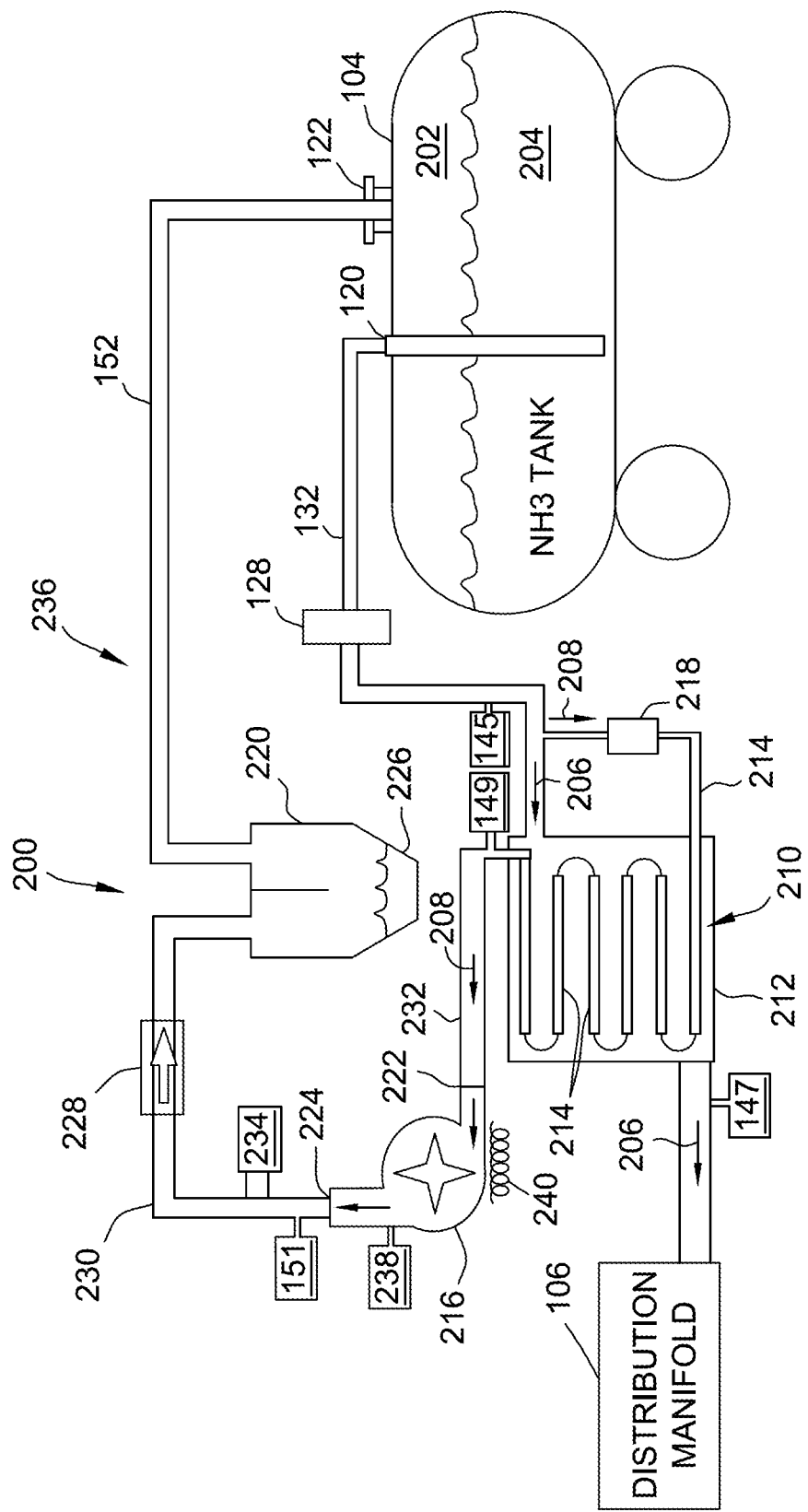
FIG. 4 is a schematic view of a vapor compression system for use with the fluid application system shown in FIG. 1.

In the exemplary embodiment, the fluid within the interior space of the fluid storage tank 104 includes vapor 202 and liquid 204 (FIG. 4). Suitably, the fluid is separated such that at least a portion of the vapor 202 is disposed above the liquid 204, for example, in the upper portion 114 of the fluid storage tank 104. In one embodiment, a sensor 124 (FIG. 3) senses characteristics of the fluid storage tank 104, such as the pressure within the storage tank 104, and sends the information to a controller 126 (FIG. 3). The controller 126 can determine diagnostic data, such as temperature, pressure, liquid amount, and/or other diagnostic data relating the liquid 204 and/or vapor 202. Based at least in part on the diagnostic data, the controller 126 can control components of the fluid application system 100.

The controller 126 may generally comprise any suitable computer and/or other processing unit, including any suitable combination of computers, processing units and/or the like that may be communicatively coupled to one another (e.g., the controller 126 may form all or part of a controller network). Thus, the controller 126 may include one or more processor(s) and associated memory device(s) configured to perform a variety of computer-implemented functions (e.g., performing the methods, steps, calculations and/or the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of controller 126 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure controller 126 to perform various functions including, but not limited to, the calculations, algorithms and/or methods described herein and various other suitable computer-implemented functions.

During operation, the fluid storage tank 104 may contain any type of fluid for distribution by the fluid application system 100. For example, the fluid storage tank 104 may store a volatile fluid intended to be applied to fields for agricultural purposes. As used herein, the term "volatile fluid" refers to a liquid or a mixture of liquid and vapor that has a tendency to evaporate or vaporize at room temperature and pressure. A common volatile fluid used for agricultural purposes is anhydrous ammonia, which is applied to fields primarily as a fertilizer to increase the nutrient level of soils. The anhydrous ammonia includes at least some gaseous substance and, therefore, is maintained at a self-regulated pressure to control the gaseous properties. In the exemplary embodiment, the fluid storage tank 104 is configured to store and allow the fluid to maintain a self-regulated pressure as fluid flows out of the fluid storage tank.

In the exemplary embodiment, the fluid storage tank 104 is fluidly connected to a filtering system 128, a vapor compression system 200, and the distribution manifold 106. A fluid line 132 channels the liquid 204 from the storage tank 104 to the filtering system 128 and vapor compression system 200. Disposed between the filtering system 128 and the fluid storage tank 104 is a quick connect coupler 134. A metering component or valve 136 is disposed downstream from filtering system 128. In suitable embodiments, the quick connect coupler 134, valve 136, filtering system 128, and vapor compression system 200 may be coupled to any portions of the fluid application system 100. For example, in some suitable embodiments, the vapor compression system 200 is disposed adjacent the fluid storage tank 104. Additionally, in some suitable embodiments, the quick connect coupler 134 may be mounted to a toolbar of the fluid application system 100, adjacent the vehicle 102. Further, in some suitable embodiments, any of the quick connect coupler 134, valve 136, and the filtering system 128 may be omitted without departing from some aspects of this disclosure.

In the exemplary embodiment, the quick connect coupler 134 facilitates the fluid storage tank 104 being connected to and removed from the fluid line 132. The valve 136 controls fluid flow through the fluid line 132. For example, the valve 136 can be positionable between a closed position, where fluid is inhibited from flowing through the fluid line 132, and an opened position, where fluid is allowed to flow through the fluid line. In suitable embodiments, the valve 136 may be any valve that enables the fluid application system 100 to function as described herein. In the exemplary embodiment, the valve 136 is a ball valve. In suitable embodiments, any additional components may disposed along the fluid line 132 that enable the fluid application system 100 to function as described herein. For example, in some embodiments, any of the following are fluidly connected to fluid storage tank 104, filtering system 128, and vapor compression system 200: a shutoff valve, a line breakaway, an excess flow valve, and a reverse flow valve. In the exemplary embodiment, the fluid application system 100 can detect malfunctions in any of the components along the fluid line 132 that may cause misapplication or improper operation.

In the example embodiment, the filtering system 128 filters and removes at least some material from the fluid. The filtering system 128 may remove materials of any type from the fluid. For example, in some embodiments, the filtering system 128 removes ferrous material from the fluid. In the exemplary embodiment, the filtering system 128 is fluidly connected between the fluid storage tank 104 and the vapor compression system 200 such that the filtering system 128 removes material from fluid flowing out of the fluid storage tank 104 prior to the fluid flowing through the rest of the fluid application system 100, such as vapor compression system 200. In suitable embodiments, the filtering system 128 may be coupled to any portion of the fluid application system 100 without departing from some aspects of this disclosure.

After filtering, the fluid is directed out of the filtering system 128 and into the vapor compression system 200. A first portion of the fluid passes through the vapor compression system 200, as is described in detail herein, and is channeled to the distribution manifold 106. A second portion of the fluid is directed out of the vapor compression system 200 and through a fluid return line 152 into the storage tank 104, for example, through the inlet 122. In one embodiment, the fluid return line 152 is coupled to the storage tank 104 via a quick connect coupler 154. In the exemplary embodiment, the quick connect coupler 154 facilitates the fluid storage tank 104 being connected to and removed from the fluid return line 152.

As shown in FIGS. 1 and 2, the distribution manifold 106 includes a plurality of fluid dispensing lines 138 each connected to a dispensing tube 140 for injecting the fluid into and/or onto soil. The distribution manifold 106 distributes the fluid to the dispensing tubes 140 for emitting the fluid from the fluid application system 100. In suitable embodiments, the fluid application system 100 may include any number of dispensing tubes 140. In some embodiments, as the fluid is emitted from the dispensing tubes 140, the vehicle 102 moves the fluid application system 100 along a desired path for fluid application, such as rows 146 of a field 148. In the exemplary embodiment, the dispensing tubes 140 are connected to or positioned behind a soil preparation mechanism 142, such as a knife or plow, that contacts the soil as the dispensing tubes 140 dispense fluid onto the soil, as best seen in FIG. 2. The soil preparation mechanisms 142 are connected to a boom 143, which is connected to and pulled behind the vehicle 102.

In some embodiments, vapor release tubes (not shown) may be connected to the soil preparation mechanism 142 and/or the dispensing tubes 140. The vapor release tubes may discharge vapor from the filtering system 128 to the ground. For example, the vapor release tubes can be configured to release potentially harmful vapors, such as vapors from anhydrous ammonia, directly into the ground. Accordingly, the vapor release tubes prevent vapors from being released into the atmosphere. In addition, any residual treatment material within the vapor is applied directly to the soil. In some embodiments, the vapor release tubes may be configured to dispense vapor from a vapor compression system, such as vapor compression system 200, for example, as a result of a line bypass, compressor or pump unloading, or during a refill transition of a vapor generator (e.g., vapor generator 408, described further herein).

In the embodiment shown in FIG. 3, the fluid application system 100 includes the controller 126 and an operator interface 144 connected to the controller. In suitable embodiments, the controller 126 may be any controller that enables the fluid application system 100 to function as described herein. The controller 126 may be connected to a plurality of sensors such that the controller 126 receives signals from the sensors. The sensors may send signals that include information relating to any characteristics of the fluid application system 100. For example, the sensors may send information including, without limitation, fluid pressures, fluid temperatures, valve duty cycles, fluid densities, valve positions, vehicle geographic position system (GPS) data, and any other suitable characteristics of the fluid application system 100.

For example, in the illustrated embodiment, the controller 126 is communicatively coupled (e.g., via wired or wireless connection) to a first sensor 145 positioned upstream of the vapor compression system 200 and a plurality of sensors, for example, a second sensor 147, a third sensor 149, and a fourth sensor 151, coupled to the vapor compression system 200. Each sensor 145, 147, 149, and 151 may be configured to detect a characteristic of the fluid application system 100, including, for example and without limitation, a temperature of the fluid, a pressure of the fluid, and/or a liquid/vapor ratio of the fluid.

In suitable embodiments, the controller 126 may perform different functions based on the signals received from the sensors. For example, the controller 126 may perform at least one of the following functions: triggering an indicating alarm, stopping fluid flow through the outlet 120, controlling a pump output rate of the vapor compression system 200, controlling an evaporator feed rate of the vapor compression system 200, and/or controlling a refill cycle of a vapor generator (e.g., vapor generator 408). In some embodiments, the controller 126 receives the signals and can determine diagnostic data based on the signals. The controller 126 may use additional information such as saturation curves and/or enthalpy charts, to determine the diagnostic data. In suitable embodiments, the diagnostic data may relate to any operational status of the fluid application system 100. The operational status may be any characteristics of the fluid application system 100 and/or fluid in the fluid application system. For example, and without limitation, the controller 126 may determine an amount of vapor 202 released through the vapor release tubes of the fluid application system 100.

In some embodiments, the controller 126 is configured to determine an operational status of the fluid application system 100 based on a temperature difference in the fluid between an upstream side of the vapor compression system 200 and a downstream side of the vapor compression system 200. In some embodiments, for example, the sensors 145, 147, 149, 151 output signals to the controller 126 indicative of a temperature and/or a pressure of the fluid at the upstream and various downstream sides, respectively, of the vapor compression system 200. The controller 126 is configured to determine the upstream and downstream fluid temperatures and/or pressures based on the signals, compare the determined fluid temperatures and/or pressures, and determine or calculate a temperature and/or pressure differential between the fluid temperature and pressure upstream of the vapor compression system 200 and the fluid temperatures and pressures downstream of vapor compression system 200.

In some embodiments, the controller 126 may also generate spatial maps of the diagnostic data based on determined positions of the system. In some embodiments, for example, the controller 126 may receive determined positions from a GPS device communicatively connected (e.g., via wired or wireless connection) to the controller 126, and generate a spatial map based on the GPS positions. The spatial map, for example, can relate the diagnostic data, such as fluid temperatures, fluid pressures, vapor release rates, and/or error readings, to corresponding positions of the fluid application system 100 at which the diagnostic data was recorded.

The diagnostic data can be used to determine and troubleshoot potential issues with the fluid application system 100 including, for example and without limitation, compressor malfunctions, metering valve malfunctions, heat exchanger malfunctions, malfunctioning valves, tripped overflow valves, empty tank detection, and sensor malfunctions. The diagnostic data can be used to recognize and correct such issues in real-time and, thereby, prevent or minimize misapplication and/or damage to the fluid application system 100. As used herein, the term "real-time" includes at least one of the times of occurrence of the associated events, the time of measurement and collection of data, the time to process the data, and the time of a system response to the events and the environment. In the embodiments described herein, these activities and events occur substantially instantaneously.

In the exemplary embodiment, the controller 126 sends the diagnostic data to the operator interface 144 for interpretation by an operator. The operator interface 144 may be any suitable interface that allows the operator to receive the diagnostic data. For example, the operator interface 144 may include a monitor mounted in the vehicle 102 to display the diagnostic data for the operator. In further embodiments, the operator interface 144 may be a mobile computing device wirelessly connected to the controller 126. In suitable embodiments, the operator interface 144 may allow the operator to input values and/or to control components of the fluid application system 100. The operator interface 144 may be coupled to the controller 126 such that commands from the operator interface 144 are relayed to the controller 126 and/or other components of the fluid application system 100.

In suitable embodiments, the controller 126 is connected to and configured to send signals to and receive signals from any components of the fluid application system 100. For example, the controller 126 may be connected to and configured to send signals to and receive signals from the vapor compression system 200, fluid storage tank 104, and/or distribution manifold 106. The signals may relate to controlling operation of any of the components connected to the controller 126. In some embodiments, the controller 126 controls operation of components based at least in part on inputs of the operator. In further embodiments, the controller 126 may automatically control some operations of the fluid application system 100 based at least in part on the determined diagnostic data.

The controller 126 may include a wireless transceiver that enables the controller 126 to connect to devices on a wireless network, e.g., Wi-Fi. Optionally, the controller 126 may include a port to allow for wired connection to devices in addition to or in place of the wireless transceiver.

FIG. 4 is a schematic view of the vapor compression system 200 for use with the fluid application system 100 (shown in FIG. 1). In the exemplary embodiment, the vapor compression system 200 is coupled between the storage tank 104 and the distribution manifold 106 to facilitate increasing the pressure in the storage tank 104 and to further enable cooling of the fluid dispensed by the distribution manifold 106 into and/or onto the soil. In the exemplary embodiment, a first portion 206 of the liquid 204 from the storage tank 104 is channeled through the vapor compression system 200, and is channeled to the distribution manifold 106. A second portion 208 of the liquid 204 from the storage tank 104 is channeled into the vapor compression system 200 as a cooling fluid portion. Cooling fluid portion 208 is channeled through fluid return line 152 into the storage tank 104, for example, through the inlet 122.

In the exemplary embodiment, the vapor compression system 200 includes an evaporator 210 positioned within a housing 212 coupled in fluid communication with the storage tank 104 and the distribution manifold 106. The evaporator 210 transfers heat from the first portion 206 of the fluid being channeled through the housing 212 to the cooling fluid portion 208 of the fluid channeled through the evaporator 210 to facilitate cooling the first portion 206, and preventing vaporization of the volatile fluid. Evaporator 210 is positioned within the flow path of the first portion 206 and includes a plurality of heat exchangers or fluid lines 214 that channel the cooling fluid portion 208 through the evaporator 210. The fluid lines 214 are positioned within the housing 212 that channels the first portion 206 of the fluid across an outer surface of each fluid line 214.

In the exemplary embodiment, the vapor compression system 200 is a vapor compression cycle system and includes the evaporator 210, a compressor 216, an expansion or metering valve 218, and an oil separator 220 (generally, a fluid separator). As described herein, the vapor compression system 200 uses a portion of the anhydrous ammonia being dispensed onto the soil as the cooling fluid or refrigerant. While the evaporator 210 is described herein as a direct-expansion (DX) system, it is noted that the evaporator 210 can be a liquid overfeed or a flooded evaporator system.

The liquid 204 exits the storage tank 104 at a first temperature and at a pressure at or above the vapor pressure-temperature curve of the fluid (e.g., anhydrous ammonia). For example, in one embodiment, with an ambient temperature of about 70 degrees Fahrenheit, the vapor pressure-temperature curve of the fluid indicates that the liquid will have a pressure of at least about 114 pounds per square inch (psi.). The high-pressure, ambient temperature cooling fluid portion 208 is channeled to the metering valve 218. The metering valve 218 regulates flow of the cooling fluid portion 208 between high and low pressures.

In the exemplary embodiment, the metering valve 218 includes a pulse-width-modulated (PWM) valve. The PWM valve is controlled by the controller 126, which sends a voltage signal to a solenoid coil of the PWM valve to actuate or "pulse" the valve between opened and closed positions according to a duty cycle. The "average flow" of the cooling fluid portion 208 is performed by adjusting the relative duration of the opening and closing times (i.e., the duty cycle). In alternative embodiments, the metering valve 218 may include a proportional expansion valve controlled, for example, by a stepper motor, or an on/off valve controlled based on evaporator sensor feedback. Alternatively, the metering valve 218 is a traditional mechanical thermal expansion valve, also known as TEV, TXV, or TX valves. In the exemplary embodiment, the vapor compression system 200 includes one metering valve 218. In other embodiments, the vapor compression system 200 may include more than one metering valve 218, connected in series or parallel. In some embodiments, for example, the vapor compression system 200 may include two metering valves connected in series, or two metering valves connected in parallel.

The metering valve 218 functions to reduce the pressure of the cooling fluid portion 208 flowing from the storage tank 104 to allow expansion and/or change of the liquid 204 to vapor 202 in the evaporator 210. In this embodiment, the high-pressure cooling fluid portion 208 entering the metering valve 218 is at approximately the same temperature as the liquid 204 within the storage tank 104. The metering valve 218 meters the cooling fluid portion 208, reducing the pressure of the cooling fluid portion 208. The cooling fluid portion 208 is thus allowed to boil and vaporize due to the pressure drop across the metering valve 218 resulting, for example, from suction generated by the compressor 216, thereby greatly reducing the temperature of the cooling fluid portion 208.

The cooling fluid portion 208 exiting the metering valve 218 flows to the evaporator 210. In the evaporator 210, the cooling fluid portion 208 receives heat from the first portion 206 of the liquid 204 flowing through the housing 212 of the vapor compression system 200, increasing the temperature of the cooling fluid portion 208 and/or causing further vaporization of the cooling fluid portion 208. The warmed cooling fluid portion 208 (i.e., warmed relative to cold, low pressure ammonia) leaving the evaporator 210 enters the compressor 216 at an inlet 222. In some embodiments, the cooling fluid portion 208 flows around and/or over an auxiliary heat source, such as a driving component (not shown) of the compressor 216, hydraulic oil, and/or engine coolant. The cooling fluid portion 208 absorbs a portion of heat generated by the auxiliary heat source to facilitate further increasing the temperature and the pressure of the warmed cooling fluid portion 208. In the exemplary embodiment, the cooling fluid portion 208 flows around and/or over a driving component of the compressor 216, which facilitates reducing the operating temperature of the driving component, and thereby increasing efficiency of the compressor 216, in addition to further increasing the temperature and pressure of the warmed cooling fluid 208.

In the example embodiment, the compressor 216 is a centrifugal compressor driven, for example, by an electric motor (not shown). Alternatively, the compressor 216 can be driven by any driving component that enables the compressor 216 to function as described herein, including, for example, a hydraulic system, a ground drive system, or an electric drive system, coupled to the vehicle 102. In one embodiment, the compressor 216 is driven, for example, by an external combustion engine. In some embodiments, the compressor 216 can be a positive displacement compressor or a high-speed turbomachine, for example. It is contemplated that the compressor 216 can include any compressor that enables the vapor compression system 200 to function as described herein, including, for example, a reciprocating compressor, a rotary compressor, such as a rotary vane, scroll, screw, or centrifugal compressor. In addition, the compressor 216 can be a hermetic, semi-hermetic, or open configuration.

In the exemplary embodiment, the moving parts of the compressor 216 require lubrication and are therefore provided with a lubricant, such as oil. It is contemplated that the compressor 216 can include a vented, sealed, or positively vented lubrication system. The lubricant is preferably contained within the compressor 216 such that no lubricant is emitted into the cooling fluid portion 208 flow. However, in some instances, the lubricant becomes intermixed with the cooling fluid portion 208 flowing through the compressor 216, and/or the cooling fluid portion 208 seeps into the crankcase of the compressor 216 and intermixes with the lubricant.

In some embodiments, the vapor compression system 200 is configured to monitor a temperature of the lubricant to detect if the cooling fluid portion 208 seeps into the compressor crankcase, and activate a heating element and/or shut off the compressor 216 in response to the detected lubricant temperature to prevent operation of the compressor 216 with cooled, high-viscosity lubricant. In some embodiments, for example, the compressor 216 includes a sensor 238 configured to detect a temperature of the lubricant, and a heating element 240 configured to heat the lubricant in response to the detected temperature. In such embodiments, the sensor 238 and heating element 240 may be communicatively coupled (e.g., via wired or wireless connection) to the controller 126, which may activate the heating element 240 in response to the detected lubricant temperature falling below a first threshold temperature. The controller 126 may shut off the heating element 240 when the detected lubricant temperature rises above a second threshold temperature, which may be the same as or different from the first threshold temperature. In some embodiments, the controller 126 may also provide an indication to the operator (e.g., an audible and/or visual alert), and/or shut off the compressor 216 in response to the detected lubricant temperature. The sensor 238 may include, for example and without limitation, a temperature sensor such as a thermocouple. The heating element 240 may include, for example and without limitation, an electric heater.

The compressor 216 pressurizes the warmed cooling fluid portion 208 generating a high-temperature, high-pressure flow of the cooling fluid portion 208. The cooling fluid portion 208 exits the compressor 216 at an outlet 224, where it is channeled to the oil separator 220. The oil separator 220 is disposed between the compressor 216 and the storage tank 104. The cooling fluid portion 208 is channeled into the oil separator 220, where any lubricant, e.g., oil, is substantially removed from the cooling fluid portion 208 and directed towards a collection portion 226 for subsequent draining and/or reuse to lubricate the moving parts of the compressor 216. The substantially lubricant free cooling fluid portion 208 exits the oil separator 220 and is channeled to the storage tank 104 via the fluid return line 152. The oil separator 220 can include, for example, a coalescing medium, serpentine passages, centrifugal separators, and/or other devices configured to separate the lubricant from the cooling fluid portion 208.

In the exemplary embodiment, the collection portion 226 also functions as a hot tank ammonia reservoir. Hot liquid ammonia may collect in the collection portion 226 along with any separated lubricant, where it may facilitate buffering pressure during high usage periods of the fluid application system 100. For example, the collection portion 226 facilitates reducing pressure drops in the storage tank 104 during periods of high usage/flow rate by vaporizing a portion of the liquid in response to drops of pressure in the storage tank 104. In addition, in some embodiments, the oil separator 220 may include one or more sensors (not shown) configured to monitor a level of the lubricant in the collection portion 226, a temperature of the lubricant, a temperature and/or pressure of liquid ammonia within the collection portion 226, and/or a flow rate of the high-temperature, high-pressure flow of the cooling fluid portion 208 flowing through the oil separator 220.

As illustrated in FIG. 4, in one embodiment, the vapor compression system 200 includes a check valve 228 positioned between the compressor 216 and the oil separator 220. The check valve 228 prevents backward flow of the high-temperature, high-pressure flow of the cooling fluid portion 208. Typically, the check valve 228 is coupled to the compressor discharge line 230, however, in some embodiments, the check valve 228 may be coupled to the fluid line 132 or the compressor suction line 232. In addition, in some embodiments, the vapor compression system 200 includes a compressor unloader valve 234, which includes a cooling fluid bypass valve for unloading the compressor 216. The compressor unloader valve 234 functions to unload the compressor, for example, for starting purposes and/or for unloading the compressor 216 when the capacity of the compressor 216 exceeds demand.

In operation, as the liquid 204 is removed from the storage tank 104 and dispensed into and/or onto the soil as fertilizer, the pressure inside the storage tank 104 is reduced. The remaining liquid 204 boils or vaporizes to replace the removed liquid volume. The boiling produces vapor 202 needed to build pressure inside the storage tank until the fluid reaches an equilibrium temperature and pressure. At equilibrium, the fluid is at the saturation point on the phase diagram, as is well known in the art. The high-temperature flow of the cooling fluid portion 208 channeled to the storage tank 104 by the compressor 216 facilitates reducing or preventing boiling or vaporization of the fluid in the storage tank 104 by increasing the pressure in the storage tank 104 as the fluid is removed. In addition, the additional volume of vapor 202 pumped into the storage tank 104 by the compressor 216 may cause adiabatic heating of the vapor 202 in the storage tank 104 (e.g., if vapor volumetric flow exceeds the liquid outflow rate), resulting in increased distribution pressure. The high-temperature vapor pressure on the lower temperature liquid 204 forces the fluid away from the saturation point of the liquid 204, thereby suppressing vaporization of the liquid 204 and facilitating stabilization of the fluid during the distribution process. Additionally, in some embodiments, vapor 202 may re-condense as warm liquid, leading to heating of the liquid 204, thereby further increasing static pressure within the storage tank 104.

In some embodiments, the vapor compression system 200 may be a multiple stage vapor compression system. For example, the vapor compression system 200 may be a two-stage compressor or include a second compressor (not shown) coupled in series with the compressor 216 to facilitate increasing the pressure of the high-temperature, high-pressure flow of the cooling fluid portion 208 being channeled back to the storage tank 104. In addition, in some embodiments, the evaporator 210 may be coupled in fluid communication with an auxiliary heat source, such as a heat source of the vehicle 102, for example, a hydraulic cooler, engine coolant, engine exhaust, an electric heating element, and/or any other source of heat to facilitate transferring heat to the cooling fluid portion 208, thereby increasing its temperature and pressure. In some embodiments, the auxiliary heat source may be a heat exchanger separate from the evaporator 210. In some embodiments, use of an auxiliary heat source separate from the evaporator 210 increases the heat exchange efficiency of the evaporator 210. For example, the auxiliary heat source may provide a desired amount of superheating of the vapor in the cooling fluid portion 208 after it exits the evaporator 210. Without an auxiliary heat source, this superheating of the vapor would need to take place in the evaporator 210, resulting in a portion of the evaporator 210 being occupied by vapor. Because the vapor can be superheated by the auxiliary heat source after exiting the evaporator 210, the evaporator 210 can be filled with more liquid, thereby increasing the operating liquid-to-vapor ratio of the evaporator 210. As a result, the evaporator 210 may have an increased heat exchange efficiency between the cooling fluid portion 208 and the fluid first portion 206, as compared to a system without an auxiliary heat source.

Figure 5:
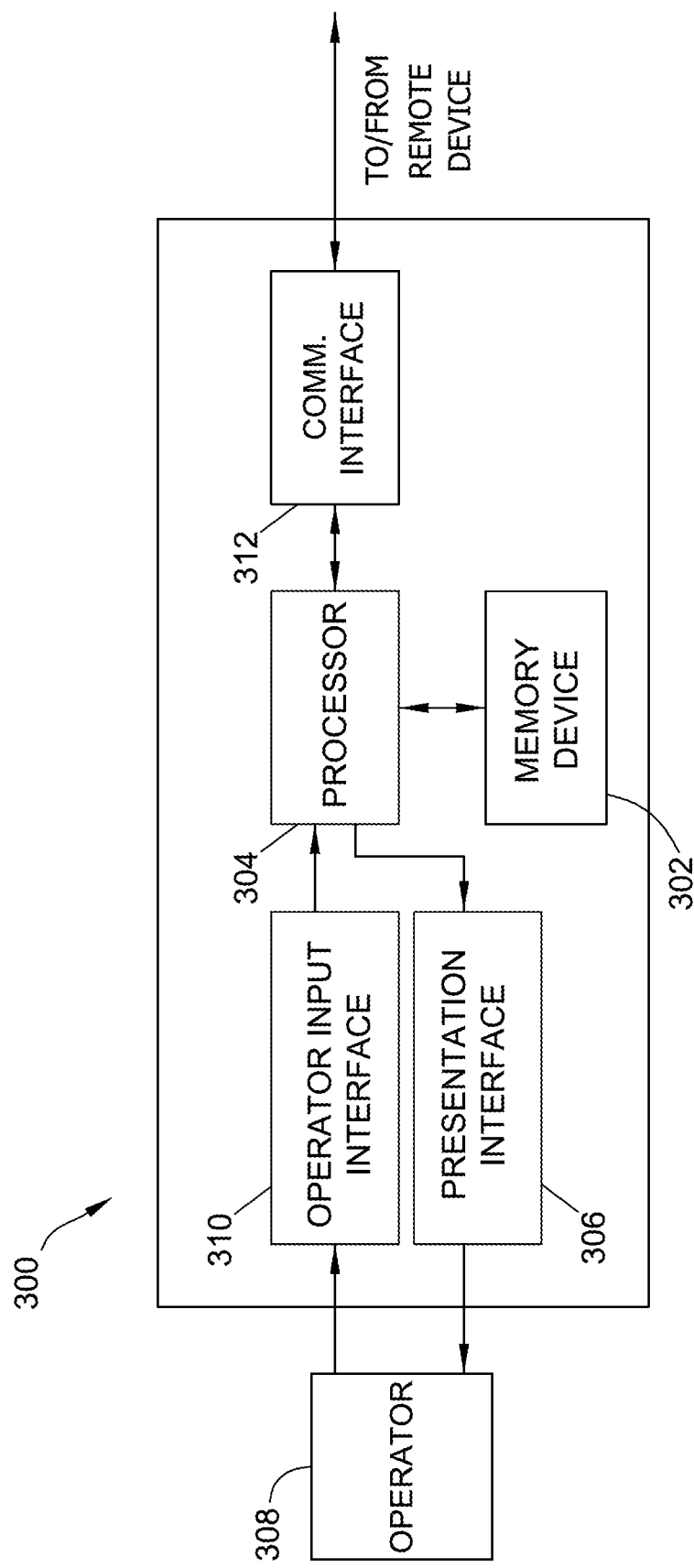
FIG. 5 is a block diagram of a computing device suitable for use in the fluid application system shown in FIG. 1.

FIG. 5 is a block diagram of a computing device 300 suitable for use in the fluid application system 100, for example, as the controller 126 or as a part of the controller 126. In the exemplary embodiment, the computing device 300 includes a memory device 302 and a processor 304 coupled to the memory device 302. The processor 304 may include one or more processing units, such as, without limitation, a multi-core configuration. In the exemplary embodiment, the processor 304 includes a field programmable gate array (FPGA). In other embodiments, the processor 304 may include or be implemented as any type of processor that enables the computing device 300 to function as described herein including, for example and without limitation a microcontroller. In some embodiments, executable instructions are stored in the memory device 302. The computing device 300 is configurable to perform one or more executable instructions described herein by programming the processor 304. For example, the processor 304 may be programmed by encoding an operation as one or more executable instructions and providing the executable instructions in the memory device 302. In the exemplary embodiment, the memory device 302 is one or more devices that enable storage and retrieval of information such as, without limitation, executable instructions or other data. The memory device 302 may include one or more tangible, non-transitory, computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

In some embodiments, the computing device 300 includes a presentation interface 306 coupled to the processor 304. The presentation interface 306 presents information, such as, without limitation, the operating conditions of the fluid application system 100, to an operator 308. In one embodiment, the presentation interface 306 includes the operator interface 144, such as, without limitation, a monitor mounted in the vehicle 102, e.g., a cathode ray tube (CRT), a liquid crystal display (LCD), an organic LED (OLED) display, or an "electronic ink" display. In some embodiments, the presentation interface 306 includes one or more display devices. In addition, or alternatively, the presentation interface 306 includes an audio output device (not shown), for example, without limitation, an audio adapter or a speaker (not shown).

In some embodiments, the computing device 300 includes an operator input interface 310. In the exemplary embodiment, the operator input interface 310 is coupled to the processor 304 and receives input from the operator 308. The operator input interface 310 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 306 and the operator input interface 310.

In the exemplary embodiment, a communication interface 312 is coupled to the processor 304 and is configured to be coupled in communication with (e.g., via wired or wireless connection) one or more other devices, such as, and without limitation, sensors 145, 147, 149, and 151, controller 126, compressor 216, and metering valve 218, and to perform input and output operations with respect to such devices while performing as an input channel. For example, the communication interface 312 may include, without limitation, a wired network adapter, a wireless network adapter, a mobile telecommunications adapter, a serial communication adapter, or a parallel communication adapter. The communication interface 312 may receive a data signal from or transmit a data signal to one or more remote devices.

The presentation interface 306 and the communication interface 312 are both capable of providing information suitable for use with the methods described herein, such as, without limitation, providing information to the operator 308 or the processor 304. Accordingly, the presentation interface 306 and the communication interface 312 may be referred to as output devices. Similarly, the operator input interface 310 and the communication interface 312 are capable of receiving information suitable for use with the methods described herein and may be referred to as input devices.

With additional reference to FIGS. 3 and 4, the controller 126 is coupled in communication with (e.g., via wired or wireless connection) one or more sensors 145, 147, 149, 151. Each sensor 145, 147, 149, 151 senses various characteristics or parameters relative to the operation and environmental conditions of the fluid application system 100, and the vapor compression system 200. Sensors 145, 147, 149, 151 may include, for example, and without limitation, temperature sensors, flow sensors, fluid pressure sensors, valve position sensors, and/or any other sensors that sense various characteristics or operating parameters relative to the operation of the vapor compression system 200. As used herein with reference to liquids or fluids, the term "characteristics" refers to physical properties whose values can be used to define the operating and environmental conditions of the fluid application system 100 and the vapor compression system 200, such as temperatures, fluid pressures, and fluid flows at defined locations.

In the exemplary embodiment, the controller 126 is coupled in operative communication to, for example, the filtering system 128, the compressor 216, the metering valve 218, the oil separator 220, and/or an electrically-controlled heat source to enable a temperature of the first portion 206 of the liquid 204 to be selectively adjusted, a flow of the cooling fluid portion 208 within a vapor-compression cooling circuit 236 of the vapor compression system 200 to be controlled, and a temperature of the cooling fluid portion 208 to be selectively adjusted. The controller 126 is electrically coupled to the vehicle 102 for receiving electrical power. Alternatively, in some embodiments, the controller 126 may be a portable device including a battery for receiving electrical power.

The controller 126 receives signals from the first sensor 145 coupled, for example, to fluid line 132 upstream of the evaporator 210 and the metering valve 218. The first sensor 145 senses a temperature and/or a pressure of the liquid 204 in the fluid line 132 and transmits a signal indicative of the sensed temperature and/or pressure to the controller 126. The second sensor 147 is positioned downstream of the evaporator 210 in the fluid line extending to the distribution manifold 106 where it is configured to detect a characteristic of the cooled liquid 204 in the fluid line 132. The second sensor 147 senses a temperature and/or pressure of the cooled liquid first portion 206 and transmits a signal indicative of the sensed temperature and/or pressure to the controller 126. The third sensor 149 is coupled to the cooling circuit 236 of the vapor compression system 200, downstream of the evaporator 210 in the compressor suction line 232. In the example embodiment, the third sensor 149 detects the presence of liquid (as opposed to vapor), and transmits a signal indicative of the presence or absence of liquid to the controller 126. Additionally or alternatively, the third sensor 149 senses a fluid temperature and/or pressure of the cooling fluid portion 208 within the cooling circuit 236, and transmits a signal indicative of the sensed fluid temperature and/or pressure to the controller 126. The fourth sensor 151 is coupled to the cooling circuit 236 of the vapor compression system 200, downstream of the compressor 216 in the compressor discharge line 230 for sensing a fluid temperature and/or pressure of the pressurized cooling fluid portion 208 within the cooling circuit 236 and for transmitting a signal indicative of a sensed fluid temperature and/or pressure to the controller 126.

The controller 126 controls actuation of the metering valve 218 to channel the cooling fluid portion 208 from the storage tank 104 to the evaporator 210 to facilitate cooling the first portion 206 of the liquid 204 when the fluid application system 100 begins to dispense the fluid into and/or onto the soil. In some embodiments, the controller 126 controls actuation of the metering valve 218 according to automated control routines that are based on, for example, characteristics of the cooling fluid portion 208, as described further herein. In addition, the controller 126 may open the valve 136 of the fluid line 132 to allow the pressure in the storage tank 104 to channel the first portion 206 of the liquid 204 to the distribution manifold 106 for dispensing into and/or onto the soil. In one embodiment, the controller 126 controls or regulates one or more operating parameters (e.g., duty cycle and/or pulsing frequency) of the metering valve 218 to meter the cooling fluid portion 208 passed to the cold side of the evaporator 210. The flow rate, and therefore the temperature and pressure of the cooling fluid portion 208, is thus regulated by the controller 126, based at least in part, on the characteristics of the cooling fluid portion 208 received from at least first sensor 145 and third sensor 149.

In some embodiments, the controller regulates the compressor 216 to pull the cooling fluid portion 208 through the evaporator 210. For example, the compressor 216 suction causes a pressure drop between the metering valve 218 and the compressor 216 promoting evaporative cooling and/or adiabatic cooling of the cooling fluid portion 208. The rapid expansion of the cooling fluid portion 208 due to the pressure drop results in thermal energy being absorbed by the low pressure fluid on the downstream side of the metering valve 218 as a result of a phase change. For example, and without limitation, the flow of the cooling fluid portion 208 is restricted by the metering valve 218 which causes the pressure on the cooling fluid portion 208 to drop. At least a portion of the cooling fluid portion 208 passing through the metering valve 218 is converted to vapor in response to the rapid drop in pressure. This "flash gas" represents a high degree of energy transfer, resulting in a decrease in temperature of the cooling fluid portion 208. The low pressure liquid and vapor combination of the cooling fluid portion 208 moves into the evaporator 210, where the rest of the liquid cooling fluid portion 208 boils or vaporizes as it absorbs heat from the first portion 206 of the liquid 204 channeled to the distribution manifold 106.

The compressor 216, controlled by the controller 126, evacuates the saturated and/or superheated vapor of the cooling fluid portion 208 from the evaporator 210. As used herein, the term "superheated vapor" refers to vapor at a temperature above its boiling point or saturation temperature for a given pressure. The amount of "superheat" or the "superheat value" refers to the amount by which the vapor is heated above its boiling point or saturation temperature at its current pressure—i.e., the temperature difference between the boiling point or saturation temperature of the vapor at its current pressure, and the actual or measured temperature of the superheated vapor. The compression of this vapor, i.e., the cooling fluid portion 208, via the compressor 216 causes adiabatic heating of the cooling fluid portion 208. The superheated vapor of the cooling fluid portion 208 is then channeled to the oil separator 220 where rapid changes in the flow direction and speed cause the lubricant in the vapor to be removed from the vapor stream. Additionally, in some embodiments, rapid changes in the flow direction within the oil separator 220 cause liquid suspended in the otherwise vapor cooling fluid portion 208 to separate out, and collect within the collection portion 226 of the oil separator 220.

In the exemplary embodiment, the controller 126 receives temperature and/or pressure data of the cooling fluid portion 208 from third sensor 149. In one embodiment, if the temperature and/or pressure of the cooling fluid portion 208 at third sensor 149 is below a predetermined threshold, the controller 126 may increase the flow rate of the cooling fluid portion 208 through the metering valve 218. For example, the controller 126 may increase at least one of a duty cycle and a pulsing frequency of the metering valve 218 to increase the flow rate. In addition, if the temperature and/or pressure of the cooling fluid portion 208 at third sensor 149 is above a predetermined threshold, the controller 126 may decrease the rate of flow of the cooling fluid portion 208 through the metering valve 218 to facilitate reducing the temperature and/or pressure of the cooling fluid portion 208 and prevent condensation of the cooling fluid portion 208 at locations downstream of the metering valve such as within the compressor 216. For example, the controller 126 may decrease at least one of a duty cycle and a pulsing frequency of the metering valve 218 to decrease the flow rate.

Furthermore, in the exemplary embodiment, the controller 126 receives temperature and/or pressure data of the cooling fluid portion 208 from fourth sensor 151. In one embodiment, if the temperature and/or pressure of the cooling fluid portion 208 at fourth sensor 151 is below a predetermined threshold, the controller 126 may regulate the output of compressor 216 to adjust the pressure and/or temperature of the compressed cooling fluid portion 208, and/or increase the rate of flow of the cooling fluid portion 208 through the metering valve 218 to facilitate reducing the pressure drop across the metering valve 218. Likewise, if the temperature and/or pressure of the cooling fluid portion 208 at fourth sensor 151 is above a predetermined threshold, the controller 126 may decrease the output of compressor 216, and/or may decrease the rate of flow of the cooling fluid portion 208 through the metering valve 218 to facilitate reducing the pressure and/or temperature of the cooling fluid portion 208.

In some embodiments, the controller 126 controls one or more operating parameters of the metering valve 218 based on a determined superheat value for the superheated vaporous cooling fluid portion 208 exiting the evaporator 210. For example, the controller 126 controls the metering valve 218 to maintain a desired set point superheat value for superheated vapor exiting the evaporator 210. The controller 126 may control, for example, at least one of a duty cycle and a pulsing frequency of the metering valve 218 to maintain the set point superheat value. In some embodiments, the set point superheat value is selected to prevent or reduce the likelihood of the cooling fluid portion 208 from condensing in certain portions of the vapor compression system 200 downstream of the evaporator 210, such as within the compressor 216. For example, if the vapor is not sufficiently superheated, the compressor 216 may cause the superheated vapor to condense within the compressor 216 as a result of increased pressure and a resultant rise in the boiling point of the superheated vapor. The set point superheat value may be selected such that it is greater than an expected rise or shift in the boiling point of the vapor caused by the compressor 216 to prevent or reduce the likelihood of the superheated vapor from condensing in the compressor 216.

The controller 126 may regulate operation of the metering valve 218 and other components of the fluid application system 100 to maintain the set point superheat value. For example, if the determined superheat value of the superheated vapor cooling fluid portion 208 exiting the evaporator 210 is below the set point superheat value, the controller 126 may decrease at least one of a duty cycle and a pulsing frequency of the metering valve 218 to increase the amount of heat absorbed by the vaporous portion of cooling fluid portion 208 as it passes through the evaporator 210. The overall amount of heat transfer between the cooling fluid portion 208 and the first portion 206 of the liquid 204 may decrease as a result. Additionally, if the determined superheat value of the superheated vapor cooling fluid portion 208 exiting the evaporator 210 is above the set point superheat value, the controller 126 may increase at least one of a duty cycle and a pulsing frequency of the metering valve 218 to decrease the amount of heat absorbed by the vaporous portion of the cooling fluid portion 208 as it passes through the evaporator 210. The overall amount of heat transfer between the cooling fluid portion 208 and the first portion 206 of the liquid 204 may increase as a result.

In some embodiments, the controller 126 is further configured to determine the superheat value for the superheated vapor exiting the evaporator 210 based on characteristics of the cooling fluid portion 208, such as temperature and pressure of the cooling fluid portion 208. Such characteristics may be received by controller 126 from sensors 145, 147, 149, 151, and/or additional sensors. In some embodiments, the controller 126 determines the superheat value of the vapor based on the temperature difference between the temperature of the liquid cooling fluid portion 208 entering the evaporator 210, and the temperature of the superheated vapor cooling fluid portion 208 exiting the evaporator 210. In such embodiments, the controller 126 may receive temperature characteristics of the cooling fluid portion 208 from a temperature sensor positioned upstream of the evaporator fluid lines 214 (e.g., from first sensor 145 or fifth sensor 405, shown in FIG. 6), and from a temperature sensor positioned downstream of the evaporator fluid lines 214 (e.g., from third sensor 149 or sixth sensor 406 shown in FIG. 6). In other embodiments, the controller 126 may determine the superheat value based on a pressure and temperature of the cooling fluid portion 208 exiting the evaporator 210. For example, the controller 126 may receive pressure and temperature characteristics of the cooling fluid portion 208 from a temperature sensor and a pressure sensor positioned downstream of the evaporator fluid lines 214 (e.g., sixth sensor 406), and calculate the superheat value based on the measured pressure, temperature, and at least one of a look-up table, a saturation curve, and an enthalpy chart for the fluid.

In yet other embodiments, the controller 126 may control the metering valve 218 and/or the compressor 216 according to other automated control routines that are based on characteristics other than temperature and/or pressure of the cooling fluid portion 208. In some embodiments, for example, the controller 126 may control the metering valve 218 and/or the compressor 216 based on a level of liquid of the cooling fluid portion 208 within the evaporator 210. In some embodiments, for example, the vapor compression system 200 includes a liquid level sensor (e.g., liquid level sensor 402, shown in FIG. 6) configured to measure a level of liquid of the cooling fluid portion 208 within the evaporator 210. In such embodiments, the controller 126 receives liquid level data of the cooling fluid portion 208 from the liquid level sensor, and increases and/or decreases the flow rate of the cooling fluid portion 208 through the metering valve 218 based on the detected liquid level. For example, if the detected liquid level of the cooling fluid portion 208 is below a predetermined threshold, the controller 126 may increase the flow rate of the cooling fluid portion 208 through the metering valve 218. For example, the controller 126 may increase at least one of a duty cycle and a pulsing frequency of the metering valve 218 to increase the flow rate. In addition, if the detected liquid level of the cooling fluid portion 208 is above a predetermined threshold, the controller 126 may decrease the rate of flow of the cooling fluid portion 208 through the metering valve 218. For example, the controller 126 may decrease at least one of a duty cycle and a pulsing frequency of the metering valve 218 to decrease the flow rate.

In another embodiment, the controller 126 receives temperature and/or pressure data of the first portion 206 of the liquid 204 being channeled to the distribution manifold from the second sensor 147, which is located downstream of the evaporator 210. In one embodiment, if the temperature and/or pressure of first portion 206 of the liquid 204 at the second sensor 147 is above a predetermined threshold, the controller 126 may decrease the rate of flow of the cooling fluid portion 208 through the metering valve 218 to facilitate reducing the temperature and/or pressure of the cooling fluid portion 208 and thus the temperature of evaporator 210. The reduced evaporator temperature facilitates increased cooling of the first portion 206 of the liquid 204 channeled to the distribution manifold 106.

In some embodiments, the controller 126 may activate or suspend an automated control routine used to control actuation of the metering valve 218 and/or the compressor 216 based on the flow rate of the first portion 206 of the liquid 204 from the vapor compression system 200 to the distribution manifold 106—i.e., the flow rate of the first portion 206 of the liquid 204 exiting the evaporator 210. In some embodiments, for example, the controller 126 may suspend the automated control routine used to control actuation of the metering valve 218 and/or suspend operation of the compressor 216 if the flow rate of the first portion 206 is below a predetermined threshold. The predetermined threshold may be based, for example, on a flow rate at which there is insufficient liquid 204 in the evaporator 210 for effective heat exchange with the cooling fluid portion 208. The controller 126 may determine the flow rate based on information received from one or more of the sensors 145, 147, 149, and 151, and/or other sensors. In some embodiments, for example, a flow meter may be coupled downstream of the evaporator 210, and the controller 126 may receive flow rate information from the flow meter. In other embodiments, the controller 126 may determine the flow rate indirectly based on a temperature differential of the first portion 206 of the liquid 204 between the inlet and the outlet of the evaporator 210. For example, the controller 126 may receive an inlet temperature of the first portion 206 of the liquid 204 flowing into the evaporator 210 from the first sensor 145, and an outlet temperature of the first portion 206 of the liquid 204 flowing out of the evaporator 210 from the second sensor 147, and determine the temperature differential based on the inlet and outlet temperatures. If the difference between the inlet and outlet temperatures of the evaporator 210 is less than a predetermined threshold and/or if the outlet temperature is above a predetermined threshold, the controller 126 will suspend the automated control routine used to control actuation of the metering valve 218 and/or suspend operation of the compressor 216. If the difference between the inlet and outlet temperatures of the evaporator 210 is greater than the predetermined threshold and/or the outlet temperature is below the predetermined threshold, the controller 126 will allow operation of the metering valve 218 according to the automated control routine, and/or allow operation of the compressor 216.

In the example embodiment, the controller 126 controls the compressor 216 to channel the superheated cooling fluid portion 208 through the oil separator 220 and to the storage tank 104 via the return line 152. The controller 126 may receive temperature and/or pressure data of the fluid in the storage tank 104. The superheated cooling fluid portion 208 facilitates increasing the average pressure and temperature of the vapor 202 in the storage tank 104. In addition, the vapor 202 interfaces with the ambient temperature liquid 204, causing heating of the liquid 204. Increasing the temperature and pressure of the vapor 202 in the storage tank 104 provides better fluid flow through the fluid application system 100. In addition, increasing the temperature and pressure of the liquid 204 in the storage tank 104 provides better fluid flow through the fluid application system 100. Moreover, the fluid application system 100, and in particular the vapor compression system 200, provides sub-cooling of the liquid 204 (e.g., actively via the heat exchanger and/or "artificially" by boosting tank pressure) to promote an increased quality distribution onto the soil.

Figure 6:
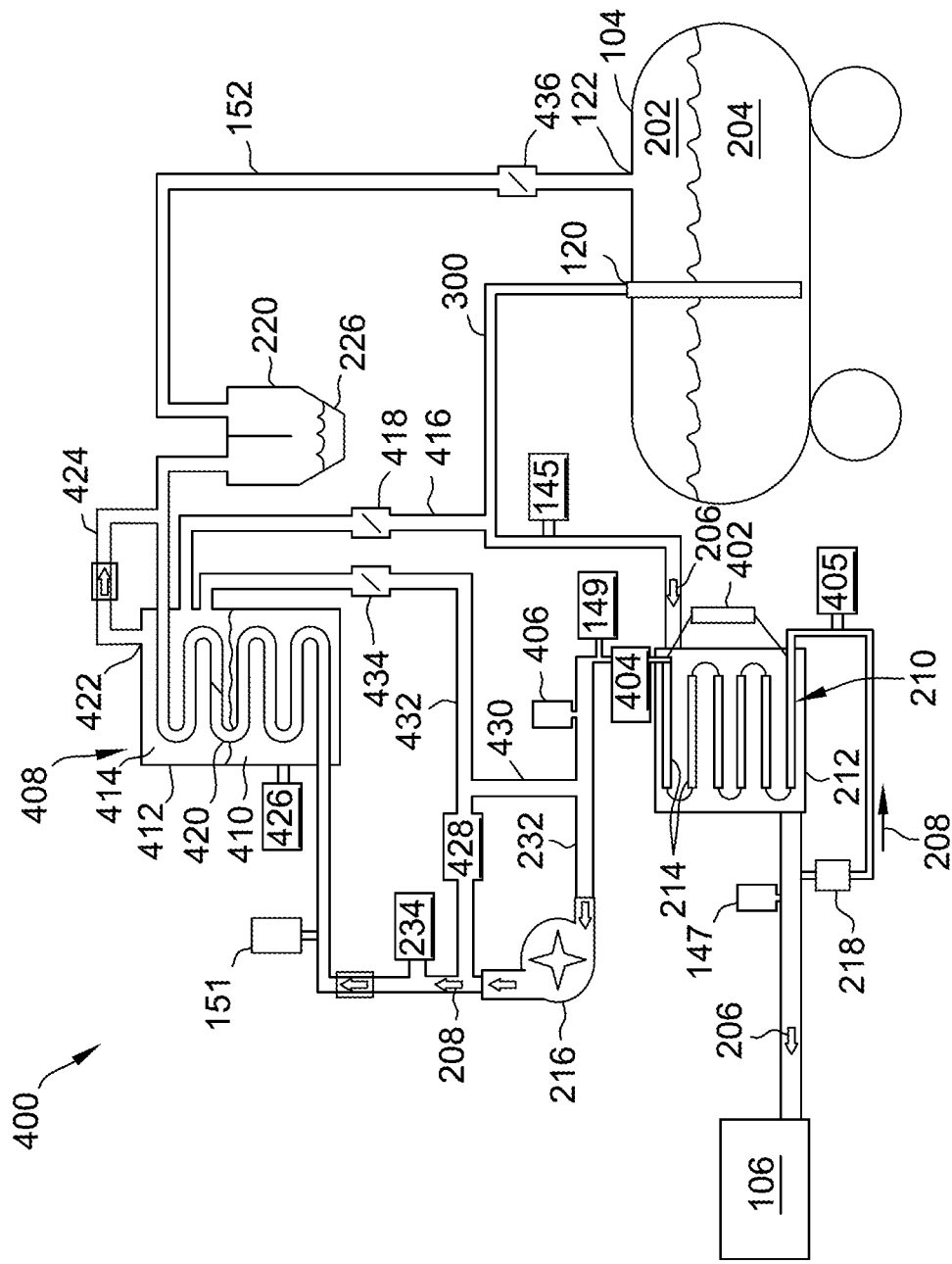
FIG. 6 is a schematic view of another embodiment of a vapor compression system suitable for use with the fluid application system shown in FIG. 1.

FIG. 6 is a schematic view of another embodiment of a vapor compression system 400 suitable for use with the fluid application system shown in FIG. 1. Unless otherwise specified, the vapor compression system 400 is substantially identical and operates in substantially the same manner as the vapor compression system 200 described herein with reference to FIGS. 1-5.

In the vapor compression system 400 of FIG. 6, the metering valve 218 is fluidly coupled with the first portion 206 of the liquid 204 from the storage tank 104 at a location downstream from the evaporator housing 212. Thus, the second portion 208 of the liquid 204 from the storage tank 104 that is channeled into the vapor compression system 400 undergoes cooling via heat exchange with the evaporator fluid lines 214 before being channeled into the vapor compression system 400.

The vapor compression system 400 also includes a liquid level sensor 402 coupled to the evaporator 210 (specifically, the fluid lines 214). The liquid level sensor 402 is configured to measure a level of liquid of the cooling fluid portion 208 within the evaporator 210. For example, the liquid level sensor 402 may be coupled to the fluid lines 214 at the inlet of the evaporator 210 and at the outlet of the evaporator. The liquid level sensor 402 may include a capacitive liquid level sensor, a magnetic liquid level sensor, an optical liquid level sensor, an inductive liquid level sensor, and/or any other type of liquid level sensor. For example, the liquid level sensor 402 may include a magnetic float (not shown) that causes a measurable change in a magnetic field based on the level of the liquid in the evaporator 210, and thereby indicates the liquid level in the evaporator 210. In some embodiments, the controller 126 (not shown in FIG. 6) receives liquid level data of the cooling fluid portion 208 from liquid level sensor 402, and increases and/or decreases the flow rate of the cooling fluid portion 208 through the metering valve 218 based on the detected liquid level, as described herein.

The vapor compression system 400 of this embodiment also includes an accumulator or auxiliary heat source 404 coupled to an outlet of the evaporator 210. In this embodiment, the auxiliary heat source 404 is fluidly coupled between the outlet of the evaporator 210, and the inlet of the compressor 216. The cooling fluid portion 208 absorbs a portion of heat generated by the auxiliary heat source 404 to facilitate further increasing the temperature and the pressure of the warmed cooling fluid portion 208 (i.e., superheating the cooling fluid portion 208). The auxiliary heat source 404 may include, for example and without limitation, a heat source of the vehicle 102 (e.g., a hydraulic cooler, engine coolant, engine exhaust), an electric heating element, and/or any other source of heat to facilitate transferring heat to the cooling fluid portion 208.

Additionally, the vapor compression system 400 of this embodiment includes a fifth sensor 405 coupled to the evaporator 210 between the metering valve 218 and an inlet to the evaporator housing 212, and a sixth sensor 406 coupled to the suction line 232, downstream from the evaporator housing 212. The fifth sensor 405 senses a temperature and/or pressure of the cooling fluid portion 208 at the evaporator inlet (i.e., before the cooling fluid portion 208 undergoes heat exchange with the first portion 206), and the sixth sensor 406 senses a temperature and/or a pressure of the cooling fluid portion 208 at the evaporator outlet (e.g., in the suction line 232). The fifth sensor 405 and the sixth sensor 406 transmit signals indicative of the sensed temperature and/or pressure to the controller 126. Additionally, in this embodiment, the third sensor 149 is a liquid detection sensor. The controller 126 may control actuation of the metering valve 218 according to the automated control routines described herein based on information received from sensors 145, 147, 149, 405, and/or 406.

The vapor compression system 400 of this embodiment also includes a vapor generator 408 coupled in fluid communication with an outlet of the compressor 216. The vapor generator 408 is configured to provide a reservoir of heated liquid that is readily vaporizable to provide a pressure buffer to the storage tank 104, for example, during high usage periods of the fluid application system 100. More specifically, the vapor generator 408 is configured to heat a liquid portion 410 of the fluid collected from storage tank 104 using the high-temperature, high-pressure flow of the cooling fluid portion 208 exiting the compressor 216. The heated liquid portion 410 is stored within a housing 412 that is connected in fluid communication with the storage tank 104, e.g., via return line 152. A portion of the heated liquid portion 410 may be vaporized, and the vapor 414 supplied to the storage tank 104, in response to pressure drops in the storage tank 104.

In this embodiment, the vapor generator 408 includes a feedline 416 for channeling a portion of the liquid 204 within the tank 104 to the interior of the vapor generator housing 412. In this embodiment, the vapor generator feedline 416 is fluidly connected to the fluid line 132 between the outlet 120 of the storage tank 104 and an inlet of the vapor generator housing 412. The vapor generator feedline 416 includes an electrically-actuated valve 418 for controlling the flow of liquid 204 to the interior of the vapor generator housing 412. The electrically-actuated valve 418 is communicatively coupled (e.g., via wired or wireless connection) to the controller 126, and the controller 126 is configured to open and close the electrically-actuated valve 418.

In this embodiment, the vapor generator 408 includes a fluid conduit or line 420 that extends through an interior of the housing 412. The fluid line 420 is in thermal communication with the liquid portion 410 for exchanging heat between the high-temperature, high-pressure flow of the cooling fluid portion 208 exiting the compressor 216 and the liquid portion 410 stored within the housing 412. The fluid line 420 is connected to the outlet of the compressor 216 for directing or channeling the high-temperature, high-pressure flow of the cooling fluid portion 208 through the interior of the vapor generator housing 412. The fluid line 420 extends through the interior of the vapor generator housing 412, and out of the vapor generator housing 412 to the oil separator 220 for directing the cooling fluid portion 208 to the oil separator 220.

The vapor generator housing 412 includes an outlet 422 connected in fluid communication with the oil separator 220 via an outlet line 424 and a check valve. In this embodiment, the outlet line 424 fluidly connects to the fluid line 420 upstream of the oil separator 220 such that vapor 414 generated by the vapor generator 408 is fed into the fluid line 420 and mixes with the cooling fluid portion 208.

In this embodiment, the vapor generator 408 also includes a seventh sensor 426 for sensing or detecting a temperature of the liquid portion 410 within the vapor generator housing 412. The controller 126 is communicatively connected (e.g., via wired or wireless connection) to the seventh sensor 426, and receives temperature data of the liquid portion 410 from the seventh sensor 426. The controller 126 may control various components of the vapor compression system 400 (e.g., the compressor 216) based on the data received from the seventh sensor 426. Additionally or alternatively, the seventh sensor 426 may include sensors other than a temperature sensor, including, for example and without limitation, a pressure sensor and a liquid level sensor. In some embodiments, for example, the seventh sensor 426 includes both a temperature sensor and a liquid level sensor.

In this embodiment, the vapor compression system 400 also includes a pressure bypass valve 428 connected in fluid communication with the outlet of the compressor 216. The pressure bypass valve 428 is configured to open, for example, when a pressure in the fluid line connected to the compressor outlet exceeds a threshold pressure differential. The pressure bypass valve 428 is connected to a pressure bypass line 430, and permits fluid flow along the pressure bypass line 430 when open. The pressure bypass line 430 is connected to the suction line 232, and thus provides fluid communication between the compressor outlet and the compressor inlet when the pressure bypass valve 428 is open. Thus, in this embodiment, the compressor 216 "self-feeds" when the pressure bypass valve 428 is open to prevent over loading of the compressor 216.

The vapor compression system 400 of this embodiment also includes a vapor generator suction line 432 fluidly connected to the bypass line 430 downstream of the bypass valve 428. The vapor generator suction line 432 is fluidly connected to the interior of the vapor generator housing 412, and provides fluid communication between the interior of the vapor generator housing 412 and the inlet of the compressor 216 (e.g., via bypass line 430). The vapor generator suction line 432 includes an electrically-actuated valve 434 for controlling fluid communication between the interior of the vapor generator housing 412 and the inlet of the compressor 216. When the electrically-actuated valve 434 is open, the interior of the vapor generator housing 412 is fluidly connected to the inlet of the compressor 216, and the compressor 216 can thus generate suction within the interior of the vapor generator housing 412.

The controller 126 is configured to control refilling of the vapor generator housing 412 with liquid 204 from the storage tank 104 by controlling actuation of electrically-actuated valve 418, electrically-actuated valve 434, and/or compressor 216. In one embodiment, for example, the controller 126 causes both electrically-actuated valves 418 and 434 to actuate into an open position, and controls compressor 216 to generate suction within the interior of the vapor generator housing 412 (e.g., via vapor generator suction line 432, bypass line 430, and suction line 232). The suction within the interior of the vapor generator housing 412 causes liquid 204 from within the storage tank 104 to flow into the interior of the vapor generator housing 412 via feedline 416.

The controller 126 may control the refilling of the vapor generator housing 412 based on characteristics of the fluid within the vapor generator housing 412 detected, for example, by the seventh sensor 426. In some embodiments, for example, when the seventh sensor 426 detects that the liquid portion 410 of the fluid within the vapor generator housing 412 exceeds a threshold temperature and/or is below a threshold liquid level, the controller 126 actuates the electrically-actuated valves 418 and 434, and controls the compressor 216 to generate suction within the interior of the vapor generator housing 412 and draw liquid 204 from the storage tank 104 into the interior of the vapor generator housing 412. The controller 126 may cease the refilling operation based on characteristics of the fluid within the vapor generator housing 412 detected, for example, by the seventh sensor 426. For example, the controller 126 may close one or both of the electrically-actuated valves 418 and 434 upon the seventh sensor 426 detecting that the liquid portion 410 of the fluid within the vapor generator housing 412 is below a threshold temperature and/or has risen above a threshold liquid level.

In this embodiment, the return line 152 includes an electrically-actuated valve 436 for controlling the flow of fluid into the storage tank 104. The electrically-actuated valve 436 is communicatively coupled (e.g., via wired or wireless connection) to the controller 126, and the controller 126 is configured to open and close the electrically-actuated valve 436 to control the flow of fluid into the storage tank 104. In other embodiments, electrically-actuated valve 436 may be a valve other than an electrically-actuated valve, such as a manually-actuated valve.

While, in some embodiments, the described methods and systems are used to handle a fluid that is applied to agricultural fields, such as anhydrous ammonia, the described methods and systems may be used for handling any type of fluids, not just fluids for use in the agricultural industry.

Embodiments of the methods and systems described herein may more efficiently apply materials, such as fluids, to surfaces compared to prior methods and systems. For example, the systems and methods described provide improved fluid application systems that increase and/or maintain the pressure of a fluid in a storage tank while fluid is withdrawn for application into and/or onto the soil. This facilitates reducing vaporization and/or boiling of the fluid in the storage tank. In addition, the systems and methods provide for cooling of the fluid being applied to the soil, thereby further suppressing vaporization of the fluid and promoting increased distribution uniformity into and/or onto the soil.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

When introducing elements of the present invention or the preferred embodiment(s) thereof, the articles "a," "an," and "the" are intended to mean that there are one or more of the elements. "Optional" or "optionally" means that the subsequently described event or circumstance may or may not occur, and that the description includes instances where the event occurs and instances where it does not. The terms "comprising," "including," and "having" are intended to be inclusive and mean that there may be additional elements other than the listed elements. Moreover, the use of "top," "bottom," "above," "below," and variations of these terms is made for convenience, and does not require any particular orientation of the components.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As various changes could be made in the above without departing from the scope of the invention, it is intended that all matter contained in the above description and shown in the accompanying drawings shall be interpreted as illustrative and not in a limiting sense.

What is claimed is:

1. A system for suppressing vaporization of a volatile fluid dispensed from a pressure vessel, said system comprising:
   an evaporator coupled in thermal communication with a first flow of volatile fluid from the pressure vessel and in fluid communication with a second flow of volatile fluid from the pressure vessel, said evaporator comprising at least one channel therein for channeling the second flow of volatile fluid therethrough;
   a metering valve coupled in fluid communication with said at least one channel and fluidly connected between said evaporator and the pressure vessel, said metering valve configured to regulate a flow rate of volatile fluid channeled to said evaporator;
   a controller coupled in communication with said metering valve, said controller configured to control an operating parameter of said metering valve to regulate a flow rate of volatile fluid channeled to said evaporator based on a superheat value of the second flow of volatile fluid;
   a compressor coupled in fluid communication with and downstream from said at least one channel; and
   a return line coupled in fluid communication with an outlet of said compressor, wherein said compressor is configured to compress the second flow of volatile fluid and channel the compressed second flow of volatile fluid to the pressure vessel via said return line.

2. The system in accordance with claim 1, wherein said metering valve comprises one of the following: a pulse-width-modulated expansion valve, a proportional expansion valve, and a mechanical thermal expansion valve.

3. The system in accordance with claim 1, wherein said controller is configured to control an operating parameter of said metering valve according to an automated control routine to regulate a flow rate of volatile fluid channeled to said evaporator, and wherein said controller is further configured to suspend the automated control routine when a determined flow rate of the first flow of volatile fluid falls below a flow rate threshold.

4. The system in accordance with claim 1 further comprising an inlet sensor at an inlet of the evaporator, and an outlet sensor at an outlet of the evaporator, said controller coupled in communication with said inlet sensor and said outlet sensor, said inlet sensor and said outlet sensor configured to detect a characteristic of the second flow of volatile fluid, wherein said controller is configured to control an operating parameter of said metering valve to regulate a flow rate of volatile fluid channeled to said evaporator based on a temperature differential detected by said inlet sensor and said outlet sensor.

5. The system in accordance with claim 1 further comprising a liquid level sensor, said controller coupled in communication with said liquid level sensor, said liquid level sensor configured to detect a characteristic of the second flow of volatile fluid, wherein said controller is configured to control an operating parameter of said metering valve based at least in part on the detected characteristic of the second flow.

6. The system in accordance with claim 1, wherein said compressor comprises one of the following: a reciprocating compressor, a rotary vane compressor, a scroll compressor, a screw compressor, a centrifugal compressor, and a turbomachine.

7. The system in accordance with claim 1, wherein the volatile fluid within the pressure vessel is at a first pressure and a first temperature, and wherein said compressor is configured to compress the second flow of volatile fluid to a second pressure and a second temperature greater than the first pressure and the first temperature, respectively.

8. The system in accordance with claim 1 further comprising a driving component, said compressor coupled to said driving component for operating said compressor.

9. The system in accordance with claim 8, wherein said driving component comprises one of the following: a hydraulic system, a ground drive system, and an electric drive system.

10. The system in accordance with claim 1, wherein said compressor comprises one of an electric motor and an external combustion engine configured to operate said compressor.

11. The system in accordance with claim 1 further comprising a heat source.

12. The system in accordance with claim 1 further comprising a fluid line coupled to an outlet of the pressure vessel, the return line coupled to an inlet of the pressure vessel, each of said fluid line and said return line comprising a quick connect coupler configured to couple said fluid line and said return line to the pressure vessel.

13. The system in accordance with claim 1 further comprising a vapor generator coupled downstream of said compressor, said vapor generator comprising:
   a housing for holding a liquid therein, said housing defining an outlet fluidly coupled to said return line via an outlet line; and
   a fluid line extending through an interior of the housing for heat exchange with the liquid, wherein said fluid line is coupled in fluid communication with said compressor outlet and said return line for channeling the compressed second flow of volatile fluid through the interior of said vapor generator housing;
   wherein vapor generated from vaporization of the liquid with said vapor generator housing is channeled to the pressure vessel via said outlet line.

14. A method for suppressing vaporization of a volatile fluid dispensed from a pressure vessel, said method comprising:
   channeling a first flow of volatile fluid from the pressure vessel to a distribution manifold;
   channeling a second flow of volatile fluid from the pressure vessel to an evaporator in thermal communication with the first flow of volatile fluid;
   expanding the second flow of volatile fluid using a metering valve to produce an expanded second flow of volatile fluid having a reduced pressure and temperature, wherein the metering valve is coupled in fluid communication with the evaporator and fluidly connected between the evaporator and the pressure vessel;
   controlling an operating parameter of the metering valve, using a controller coupled in communication with the metering valve, to regulate a flow rate of volatile fluid channeled to the evaporator based on a superheat value of the second flow of volatile fluid;

compressing the expanded second flow of volatile fluid using a compressor coupled to the evaporator to produce a compressed second flow of volatile fluid having an increased pressure and temperature; and channeling the compressed second flow of volatile fluid to the pressure vessel via a return line, wherein the pressure and the temperature of the compressed second flow of volatile fluid are greater than a tank pressure and a tank temperature, respectively, of volatile fluid contained in the pressure vessel.

15. The method in accordance with claim 14 further comprising determining the superheat value, using the controller, based on at least one of a temperature and a pressure of the expanded second flow of volatile fluid.

16. The method in accordance with claim 14 further comprising:
controlling an operating parameter of the metering valve, using the controller, according to an automated control routine to regulate a flow rate of volatile fluid channeled to the evaporator; and
suspending the automated control routine when a determined flow rate of the first flow of volatile fluid falls below a flow rate threshold.

17. The method in accordance with claim 14, wherein channeling the first flow of volatile fluid from the pressure vessel comprises cooling the first flow of the volatile fluid via the evaporator, said method further comprising dispensing the cooled first flow of volatile fluid at least one of onto and into soil using the distribution manifold.

18. The method in accordance with claim 14 further comprising:
channeling the compressed second flow of volatile fluid to a fluid separator positioned between the compressor and the pressure vessel;
removing a lubricant from the compressed second flow of volatile fluid in the fluid separator; and
channeling the lubricant to a collection portion of the fluid separator for at least one of draining and reuse.

19. The method in accordance with claim 14 further comprising coupling the compressor to a driving component configured to drive the compressor, wherein the driving component includes one of the following: a hydraulic system, a ground drive system, an electric drive system, an integrated electric motor, and an external combustion engine.

20. The method in accordance with claim 14 further comprising coupling the evaporator in thermal communication to a heat source including one of the following: a hydraulic cooler, engine coolant, and engine exhaust.

21. The method in accordance with claim 14 further comprising:
coupling a fluid line to the pressure vessel and the evaporator; and
coupling the return line to the pressure vessel and the compressor, wherein each of the fluid line and the return line includes a quick connect coupler configured to couple the fluid line and the return line to the pressure vessel.

22. A fluid application system comprising:
a fluid line configured to channel a flow of volatile fluid from a pressure vessel;
a distribution manifold coupled in fluid communication to said fluid line, said distribution manifold comprising a plurality of fluid dispensing lines, said distribution manifold configured to receive a first flow of volatile fluid from said fluid line and channel the first flow of volatile fluid to said plurality of fluid dispensing lines; and
a vapor compression system coupled in fluid communication to said fluid line, said vapor compression system comprising:
an evaporator comprising at least one channel therein for receiving a second flow of volatile fluid from said fluid line and channeling the second flow of volatile fluid therethrough;
a metering valve coupled in fluid communication with said at least one channel and fluidly connected between said evaporator and the pressure vessel, said metering valve configured to regulate a flow rate of volatile fluid channeled to said evaporator;
a controller coupled in communication with said metering valve, said controller configured to control an operating parameter of said metering valve to regulate a flow rate of volatile fluid channeled to said evaporator based on a superheat value of the second flow of volatile fluid;
a compressor coupled in fluid communication with and downstream from said at least one channel; and
a return line coupled in fluid communication with an outlet of said compressor;
wherein said evaporator is coupled in thermal communication with the first flow of volatile fluid for cooling the first flow of volatile fluid, and wherein said compressor is configured to compress the second flow of volatile fluid and channel the compressed second flow of volatile fluid to the pressure vessel via said return line.

23. The fluid application system in accordance with claim 22 further comprising a plurality of soil preparation mechanisms coupled to said distribution manifold, wherein each soil preparation mechanism of said plurality of soil preparation mechanisms comprises a dispensing tube, wherein each dispensing tube of said plurality of fluid dispensing lines is coupled to a respective fluid dispensing line of said plurality of fluid dispensing lines.

24. The fluid application system in accordance with claim 22, wherein said vapor compression system further comprises a compressor unloader valve configured to unload said compressor.

25. The fluid application system in accordance with claim 22, wherein said vapor compression system further comprises a check valve coupled in fluid communication and downstream of said compressor, said check valve configured to prevent flow of the second flow of volatile fluid from said return line to said compressor.

26. The fluid application system in accordance with claim 22 further comprising a filtering system coupled in fluid communication with said fluid line and fluidly connected between said evaporator and the pressure vessel.

27. The system in accordance with claim 22 further comprising an inlet sensor at an inlet of the evaporator, and an outlet sensor at an outlet of the evaporator, said controller coupled in communication with said inlet sensor and said outlet sensor, wherein said controller is configured to control an operating parameter of said metering valve to regulate a flow rate of volatile fluid channeled to said evaporator based on a temperature differential detected by said inlet sensor and said outlet sensor.

28. The system in accordance with claim 22 further comprising a liquid level sensor, said controller coupled in communication with said liquid level sensor, said liquid level sensor configured to detect a characteristic of the second flow of volatile fluid, wherein said controller is configured to control an operating parameter of said metering valve to regulate a flow rate of volatile fluid channeled to said evaporator based at least in part on the detected characteristic of the second flow.

29. The fluid application system in accordance with claim 22, wherein said controller is configured to control an operating parameter of said metering valve according to an automated control routine, and wherein said controller is further configured to suspend the automated control routine when a determined flow rate of the first flow of volatile fluid falls below a flow rate threshold.

30. The system in accordance with claim 1, wherein said controller is further configured to determine the superheat value based on at least one of a temperature and a pressure of the expanded second flow of volatile fluid.

* * * * *